United States Patent
Hanifen et al.

(10) Patent No.: US 10,158,632 B2
(45) Date of Patent: Dec. 18, 2018

(54) METHODS AND APPARATUS FOR ACCOUNT LINKING

(71) Applicant: Under Armour, Inc., Baltimore, MD (US)

(72) Inventors: Jim Hanifen, Baltimore, MD (US); Louise Killeen-Ewing, Austin, TX (US); Eric Wood, Austin, TX (US); Thomas Ryon Day, Austin, TX (US); Karlo Berket, San Francisco, CA (US)

(73) Assignee: Under Armour, Inc., Baltimore, MD (US)

(*) Notice: Subject to any disclaimer, the term of this patent is extended or adjusted under 35 U.S.C. 154(b) by 62 days.

(21) Appl. No.: 15/002,036

(22) Filed: Jan. 20, 2016

(65) Prior Publication Data

US 2017/0208060 A1  Jul. 20, 2017

(51) Int. Cl.
*H04L 29/06* (2006.01)
*G06F 17/30* (2006.01)
*H04W 4/50* (2018.01)
*H04W 12/06* (2009.01)

(52) U.S. Cl.
CPC .... *H04L 63/0861* (2013.01); *G06F 17/30525* (2013.01); *H04L 63/126* (2013.01); *H04W 4/50* (2018.02); *H04W 12/06* (2013.01)

(58) Field of Classification Search
CPC .................................................. H04L 63/0861
USPC ............................................................ 726/4
See application file for complete search history.

(56) References Cited

U.S. PATENT DOCUMENTS

| | | | |
|---|---|---|---|
| 7,228,417 B2 | 6/2007 | Roskind | |
| 7,260,836 B2 | 8/2007 | Roskind et al. | |
| 7,305,470 B2 | 12/2007 | Tom et al. | |
| 7,765,584 B2 | 7/2010 | Roskind | |
| 7,788,376 B2 | 8/2010 | Tom et al. | |
| 8,161,157 B2 | 4/2012 | Tom et al. | |
| 8,196,189 B2 | 6/2012 | Roskind | |
| 8,490,166 B2 | 7/2013 | Frank | |
| 8,763,152 B2 | 6/2014 | Vernal et al. | |
| 9,154,568 B2 | 10/2015 | Alison et al. | |
| 2003/0163737 A1 | 8/2003 | Roskind et al. | |
| 2004/0158574 A1 | 8/2004 | Lee et al. | |
| 2007/0169181 A1 | 7/2007 | Roskind | |
| 2011/0023101 A1 | 1/2011 | Vernal et al. | |
| 2012/0174203 A1 | 7/2012 | Frank | |
| 2013/0254849 A1 | 9/2013 | Alison et al. | |

(Continued)

*Primary Examiner* — Jacob Lipman
(74) *Attorney, Agent, or Firm* — Maginot, Moore & Beck LLP

(57) ABSTRACT

Apparatus and methods are provided for enabling a plurality of applications running on a user device or in communication therewith to share data. In one exemplary embodiment, a single user device is configured to run a plurality of heath-monitoring applications which collect data from a respective plurality of health-monitoring devices and/or via user entry. According to the present disclosure, once the applications are linked, the user accesses, views, and analyzes the plurality of health-related data from the plurality of applications at a single application. Moreover, once the applications are linked, the user may sign-in to one application and be automatically signed into the other applications. In this manner, the user's activity and updated information entered, sensed, or otherwise collected into or by one application may be accessible at the other applications for analysis and display therein as well.

20 Claims, 6 Drawing Sheets

(56) References Cited

U.S. PATENT DOCUMENTS

2013/0254850 A1 9/2013 Thomas et al.
2014/0236716 A1 8/2014 Shapiro et al.
2014/0245407 A1 8/2014 Vernal et al.

METHODS AND APPARATUS FOR ACCOUNT LINKING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to the field of account linking. More particularly, the present disclosure relates to methods, devices, systems, and computer programs for enabling a user to link several disparate applications thereby enabling these applications to share data, and creating a single sign-on experience for the user into the two or more linked applications.

BACKGROUND

The background description provided herein is for the purpose of generally presenting the context of the disclosure. Unless otherwise indicated herein, the materials described in this or any section of the disclosure are not prior art to the claims in this application and are not admitted to be prior art by inclusion herein.

Recent advancements in electronics technology has led to the widespread use of portable devices which are able to run computer applications thereon. Accordingly, a wide variety of applications have been developed for mobile use. Among this array of recently developed mobile applications, a large number have been developed which are intended to monitor health-related parameters. These applications utilize data collected by biometric monitoring devices external to the mobile device on which the application is run (or contained within the same mobile device), and/or which is manually entered by a user. Health-related monitoring applications may include applications which monitor activity (e.g., a number of steps taken, flights of stairs, hours of sleep, etc.), measure biometric parameters (e.g., hear rate, blood pressure, etc.), monitor food intake, and/or which measure other environmental parameters (e.g., temperature, altitude, etc.). Accordingly, data is collected and monitored within this vast landscape of applications.

Data collection and monitoring across the plurality of applications creates a significant problem for the user in terms of being unable to coordinate information across the different applications. Hence, what is needed is a means for linking one or more accounts to enable the user to access and analyze data across several disparate applications in a single application. Ideally, the user would be further empowered to utilize a single sign-on credential across the multiple applications. Apparatus and methods for accomplishing the foregoing are provided in the present disclosure.

SUMMARY OF THE DISCLOSURE

The present disclosure addresses the foregoing needs by disclosing, inter alia, methods, devices, systems, and computer programs for account linking.

Specifically, methods, apparatus, computer applications, and systems are provided to enable a user to link several disparate applications thereby enabling these applications to share data, and creating a single sign-on experience for the user.

These and other aspects of the disclosure shall become apparent when considered in light of the disclosure provided herein.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

All Figures© Under Armour, Inc. 2015-2016. All rights reserved.

DETAILED DESCRIPTION

Exemplary Embodiments

Disclosed embodiments include systems, apparatus, methods and storage medium associated with account linking in general, and in particular enabling linked applications to share data, and creating a single sign-on experience for the linked applications.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
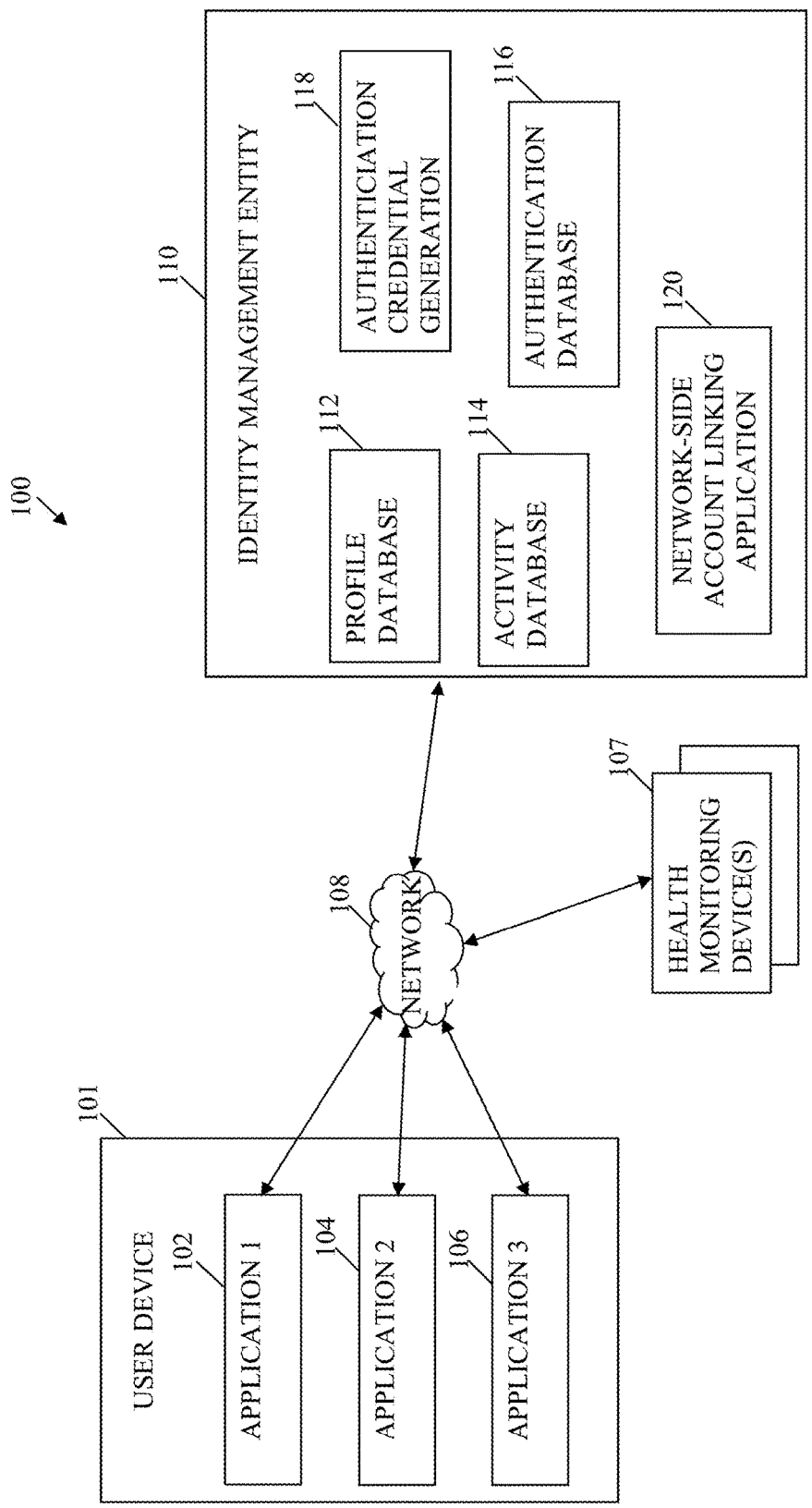
FIG. 1 is a block diagram illustrating an exemplary network for enabling account linking in accordance with one embodiment of the present disclosure.

Referring now to FIG. 1, an exemplary network 100 for enabling account linking in accordance with one embodiment of the present disclosure is illustrated. As shown, the network 100 generally comprises a user device 101 in communication with a plurality of health monitoring devices 107 and an identity management entity 110 via a network 108.

The user device 101 (or client device) comprises a stationary or portable computing apparatus which is configured to run a plurality of software applications thereon (as discussed in detail below). For example, the user device 101 may comprise a desktop computer (such as those available from Dell Computing of Austin, Tex.), or smartphone, computing tablet, laptop computer, electronic reader, personal digital assistant, and so forth. Exemplary embodiments include e.g., Galaxy S4® from Samsung Electronics of Seoul, Korea, iPhone® or iPad® from Apple Computer of Cupertino, Calif.

The plurality of health monitoring devices 107 may comprise one or more portable computing devices designed to measure, sense, monitor, or otherwise receive biometric, environmental, and/or activity parameters. In one variant, certain ones of the health monitoring devices 107 comprise wearable health-related parameter measurement and computing devices, such as e.g., a smart watch, an activity tracker, a heart rate monitor, a sleep tracking device, a nutrition tracking device, a smart scale, and/or smart eyeglasses. In addition, an exemplary monitoring device 107 may comprise a smart phone having one or more of the foregoing capabilities and/or which enables user entry of the foregoing parameters. In a further embodiment, the user device 101 may provide additional functionality as one of the plurality of monitoring devices 107 (e.g., the user device 101 may comprise a smart phone having health monitoring capabilities).

The monitoring devices 107 provide sensed or obtained data to the user device 101 via the network 108. The sensed data comprises data which the particular device 107 is configured to collect (such as activity, biometric, and environmental data). For example, an activity tracking device is configured to collect activity data such as steps taken, distance traveled, rate or pace of a run, and/or flights of stairs climbed, etc.; a heart rate monitor is configured to collect heartbeat data; a sleep tracking device collects data relating to how much time a user/wearer spends sleeping; a nutrition tracking device collects data relating to food and drinks consumed by a user; a smart scale collects data relating to a body weight, body fat percentage, and/or body mass index (BMI), etc. Furthermore, a smart watch and/or smart phone, may be utilized as an activity tracking device, a heart rate monitor, a sleep tracking device, and/or a nutrition tracking device. The collected data is provided to one or more applications running on the user device 101 in real time.

As shown in FIG. 1, the exemplary user device 101 is configured to run three applications: Application 1 102, Application 2 104, and Application 3 106; however, it is appreciated that any number of applications configured to receive collected data from individual ones of the monitoring devices 107 may be run by the user device 101. Exemplary applications include e.g., UA Record™, MapMyFitness®, MyFitnessPal®, Endomundo®, etc. each owned by assignee hereof. Other health activity related monitoring applications may additionally be utilized in connection with the present disclosure, such as those specifically designed to receive information from a particular health monitoring device (i.e., an application which is published by the device manufacturer); the foregoing being merely representative of the general concepts of the present disclosure.

The network 108 which enables communication between the user device 101, the plurality of monitoring devices 107, and the identity management entity 110 (discussed below) may comprise a wired and/or wireless, private and/or public network, including e.g., the Internet. Accordingly, each of the monitoring devices 107, the user device 101, and the identity management entity 110 is configured with appropriate networking communication interfaces. An example of wired communication interface may include, but is not limited to, Ethernet; while examples of wireless communication interfaces may include, but are not limited to, near field communication (NFC), Bluetooth, WiFi, 4G or 5G LTE. It is further appreciated that various gateways, routers, switches, based stations, and so forth may be placed between the communication interfaces of foregoing devices.

The identity management entity 110 comprises a server or other computerized apparatus configured to store a plurality of data into one or more unique tables or databases and to run one or more computer applications or programs thereon. In the illustrated example, the identity management entity 110 comprises a profile database 112, an activity database 114, and an authentication database 116. However, it is appreciated that any number of tables and/or any type of data (such as that relating to the sensed data, the user, the user device 101, the monitoring devices 107, etc.) may be stored in a database or table at the identity management entity 110. For example, a database may be provided to store information regarding started, but not completed, account profiles. In one embodiment, the started/incomplete accounts may be further linked to one or more potential accounts via e.g., matching of information entered therein to information in the other account profiles (e.g., email address matching). In another variant, a separate database (not shown) may be provided to store a user's privacy settings which may then be accessed across each of the connected or linked applications. Alternatively, the aforementioned privacy settings may be stored at e.g., the authentication database 116.

The profile database 112 comprises a data store or table wherein information relating to each user is stored. The stored information may include individual data records for each user comprising information relating to e.g., each user's height, weight, sex, etc. In addition, these data records may include the user's known interests, such as e.g., running, yoga, basketball, etc.; as well as the user's inspirational figures and celebrities of interest. It is noted that, in one variant, the user's sex may be divided into two separate categories, one to identify the user's biological gender (i.e., determined at birth) and the other to identify the user's gender identity (i.e., that to which he/she associates him/herself irrespective of biological gender). The records may be anonymized using a cryptographic hash of the user's identifying information (such as user identifier, email address, etc.).

The profile data may be shared across the applications, once linked. For example, the profile information may be pulled from one application to preload into a linked application which is newly downloaded to the user's device. In another example, the profile data may be collected by a first device and/or application, uploaded to the database, and then pulled down by a second device and/or application. Specifically, a nutrition application which determines a calorie goal for a user may require the user's weight, such information is collected by a smart scale and provided to the profile database 112 via a smart scale application; the user's weight may then be pulled from the database 112 by the nutrition application to continue the calculation. In a further example, data which is modified at one application is additionally modified in the linked applications (e.g., updates to the user's weight are passed into all of the connected applications after it is collected at a smart scale and stored at the network database as being associated to the user).

The activity database 114 comprises a data store or table wherein information relating to the sensed or collected activity of each user is stored. For example, the stored data may include e.g., steps, activity, sleep, nutrition, etc. The data may be temporarily held at the activity database 114 in one embodiment; then after a predetermined length of time, transitioned to a permanent storage entity (not shown). In another embodiment, the data may be identified such as by a tag or other identifier as to the source and/or type of data. For example, data records may be individually tagged as being collected from an activity tracking device, a heart rate monitor, a sleep tracking device, a nutrition tracking device, etc. Additionally or in the alternative, the collected data records may be tagged as step data, nutrition data, heart rate data, sleep data, etc. In a further embodiment, additional data is collected at the activity database 114 relating to specific device usage. In other words, the database 114 may collect information relating to the date/time of last use of each device or application such as via utilization of a date/timestamp.

Once the applications are linked and able to share data via the identity management entity 110, activity data may be shared among the applications as well. Accordingly, a single application (e.g., Application 1 102) may pull information collected by various health monitoring devices 107 to generate an accurate picture or representation of the user's status including: nutrition, sleep, activity, etc., and display this data in a unified interface. Additionally, updates to data collected in one application may be populated in the other linked applications.

The authentication database 116 comprises a data store or table which stores information relating to the applications to which each user is authenticated. In one variant, the stored data in the authentication database 116 comprises the user identifiers (such as unique user names or email addresses) and passwords for each registered user. The aforementioned stored data may be cryptographically hashed so as to protect the identity and sensitive information of the users.

As will be discussed in further detail below, the authentication database 116 facilitates account linking across the disparate applications. Specifically, when a user seeks to link a first application with one or more second applications, the authentication database 116 is reviewed or queried to determine whether the user has previously established an account with the one or more second applications. When it is determined that the user has previously established an account with one or more of the second applications to which the first is intended to be linked, the authentication database 116 is able to provide the user identifier, email address, and/or account credentials (as discussed below) linked to the account. In this manner, the system is able to accurately locate the user and his/her data across multiple applications.

In addition, the identity management entity 110 is configured to run at least one authentication credential generation application 118 and at least one network-side account linking application 120. Alternatively, these may be run on a server or other entity located remote to the management entity 110 but in communication therewith.

The authentication credential generation application 118 comprises one or more software applications which are configured to generate authentication credentials. As is discussed in further detail below, the process by which applications are linked via the identity management entity 110 utilizes one or more authentication credentials which are exchanged between the applications to be linked. The credentials may include e.g., security tokens, hardware tokens, access tokens, authentication tokens cryptographic tokens, physical devices for computer authentication, and/or system objects representing the subject of an access control operation.

In one embodiment, the credentials are encrypted and have a limited lifespan. Hence, the credential generation application 118 may be configured to, in addition to generating the credentials, cause the credentials to be encrypted, as well as to place a timestamp or other indicator of an expiration thereof on the credentials. In one variant, once granted, the tokens have a validity period during which data contained in the credential generation application 118 may be used in the decryption process. After the validity period has expired, the data will not be able to decrypt any longer, it is in this failure that the system becomes aware that the token has expired.

The network-side account linking application 120 is run on the identity management entity 110 in one embodiment. The account linking application 120 performs those steps necessary to link one or more applications (e.g., health monitoring applications). In one embodiment, the account linking application 120 receives the request to link two applications, consults the authentication database 116 to determine whether the requesting application is authenticated. Once authenticated, it is next determined whether the user of the first application is associated to the second application to which the first application is requesting to be linked. When the user is identified, the account linking application 120 then links the accounts/applications in the profile database 112 and activity database 114 as being the same user.

In a further variant, the network-side account linking application 120 is configured as a distributed application with a portion thereof being run at the client device 101 (i.e., a client-side account linking application as will be discussed below). According to this variant, a portion of the foregoing functionality is performed locally at the client device 101 and/or the distributed applications coordinate to perform the functionality discussed herein.

It is appreciated that the identity management entity 110 may comprise additional applications which contribute to the functioning thereof as described herein and/or the foregoing functionality may be distributed across more applications or combined into fewer applications. For example, the aforementioned data collection may be provided via a separate application not discussed herein for ease of understanding. The necessary components of the management entity 110 will be clear to a person of ordinary skill in the art given the discussion of the functionality herein. Moreover, it is appreciated that the aforementioned databases and application(s) may comprise one or more separate entities in communication with one another (not shown), such as via the network 108.

Figure 2:
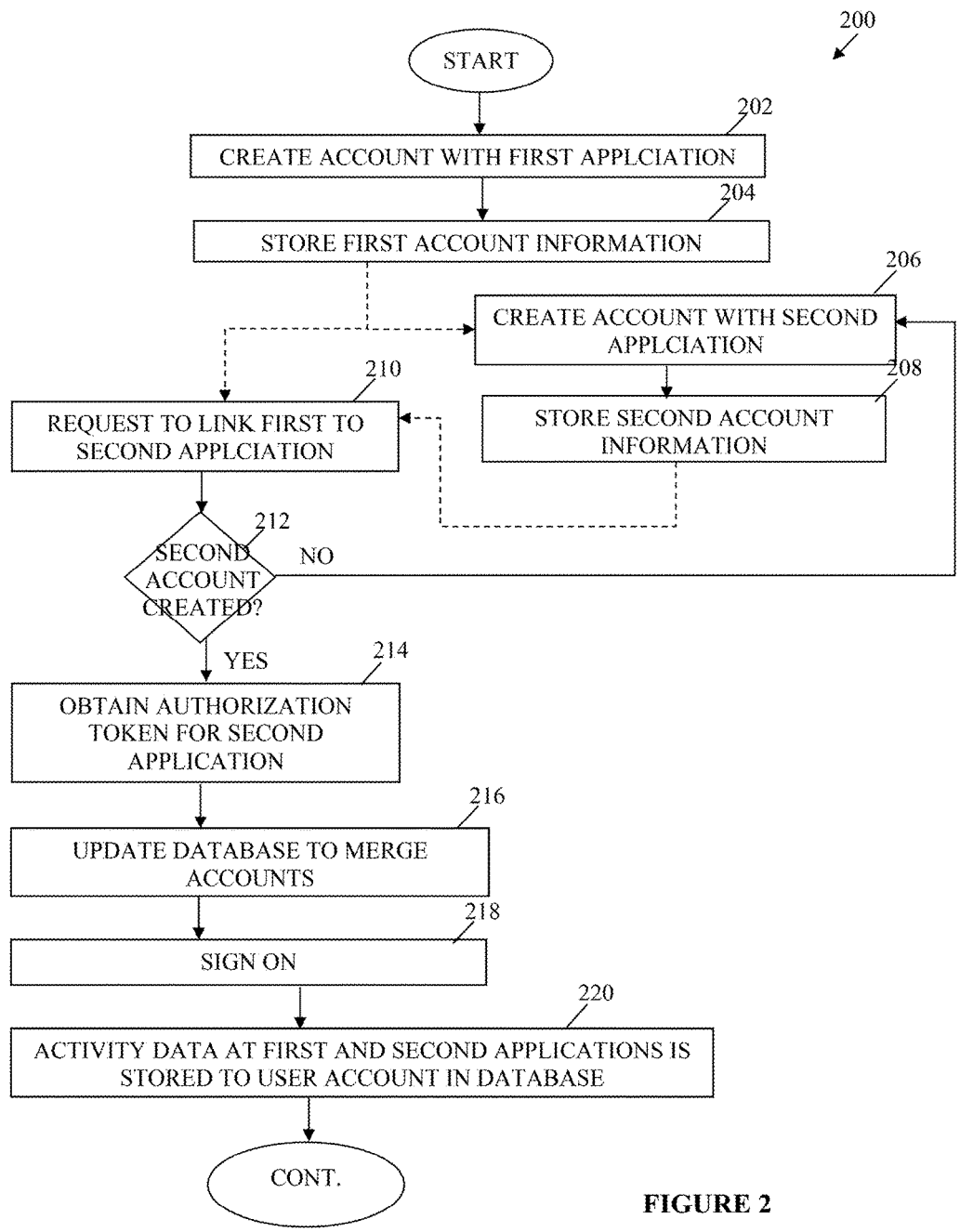
FIG. 2 is a logical flow diagram illustrating an exemplary method for account linking in accordance with one embodiment of the present disclosure.

Referring now to FIG. 2, an exemplary method 200 for enabling a user to link several disparate applications thereby enabling these applications to share data, and creating a single sign-on experience is given. At step 202 of the method, the user creates an account with the first application. To create the account, the user provides a unique user identifier and password. In one embodiment, the user identifier comprises an email address. Alternatively, any means of uniquely identifying the user may be utilized as the user identifier. The account creation may include providing additional account information to the first application (in addition to the user identifier and password combination), which per step 204 is stored. The additional account information may comprise, for example, user-related information such as height, weight, activity level, sex, activities of interest, athletes of interest, etc. The aforementioned information is stored in a storage location specifically reserved for the first application at e.g., the identity management entity 110, the user device 101, and/or other storage entity (not shown) in communication with the first application via the network 108. In addition, the authentication credential generation application 118 and the account linking application 120 cooperate to create a record for the user within the authentication database 116 (which includes an authentication credential), the profile database 112, and the activity database 114.

In one variant, the method 200 proceeds next to step 206, where the user may create an account with a second application. (Optionally, the method 200 may instead continue to step 210 as discussed below.) The account creation, as was discussed above for the first account information, comprises setting a user identifier and password combination as well as providing certain additional account information if necessary. Next, at step 208, the second account information is stored at a storage location specifically held for the second application located at e.g., the identity management entity 110, the user device 101, and/or another storage entity (not shown) in communication with the second application via the network 108, and appropriate database records are created. The foregoing variant may occur in the instance the user creates the second account prior to electing to connect the first and second accounts.

Alternatively, the method 200 may instead proceed from step 204 to step 210; i.e., creation of the second account occurs after an election to connect the first and second applications. Specifically, the user may simply create an account with the first application (steps 202-204), then upon opening the first application, select a link (step 210) within the first application which enables the user to connect the first application to one or more second applications. By following the link, at step 212, it is determined whether the user has established an account with the second application. In one embodiment, this is accomplished via a query by the network-side account linking application 120 to the appropriate database within the identity management entity 110 (e.g., the authentication database 116). In the instance that the user has not previously established an account with the second application, the process 200 proceeds to steps 206-208 (discussed above) wherein the user creates an account with the second application, and the user's account information is stored and recorded in the appropriate databases. In the instance that the user has previously established an account with the second application, the method 200 proceeds to step 214, where the authentication database 116 is queried for an authentication token for the user at the second application.

The authentication token authorizes the user of the first application to access account and profile information associated to the second application. The authentication database is then updated, step 216, to merge the user's accounts in the first and second applications. When the user next signs in to either the first or second applications (step 218), activity data is stored to a shared activity database 114. In this manner, either application may utilize the activity data of the other linked applications to derive health-related estimates and conclusions.

In one example, a unified graphic user interface (GUI) may be provided to a user which displays information obtained in all of the connected applications. Further, the unified GUI may comprise one of the aforementioned health-monitoring applications 102, 104, 106, etc. In another example, the foregoing may be utilized such that when a user signs into one of the connected applications, he is automatically signed into all of the other connected applications. Accordingly, any data or changes made in one application are reflected in the other applications.

It is appreciated that while the foregoing example is given with respect to a first and a second application being linked, the first application may link to multiple second applications using substantially similar logic as that discussed above.

As will be discussed in greater detail below, the present discussion illustrates three individual embodiments for providing the account linking functionality described above. In a first embodiment, account linking is performed using a password manager; in a second embodiment, account linking is performed using direct application communication; in a third embodiment, account linking is performed using email verification. Hence, the exemplary device 101 of FIG. 3 therefore includes several features which are illustrated as optional features to accommodate these embodiments (shown by dashed lines). However, it is appreciated that any of the features discussed in one embodiment may be utilized in conjunction with any of the features of the other embodiments without departing from the goals of the present disclosure (e.g., account linking). Moreover, any number of other embodiments may be utilized to accomplish the goals set forth herein, the foregoing being merely illustrative of the general concepts of the disclosure. For example, push notifications and/or text messages may be utilized in a manner similar to the email option discussed herein. Each of these embodiments will be discussed in further detail below.

Figure 3:
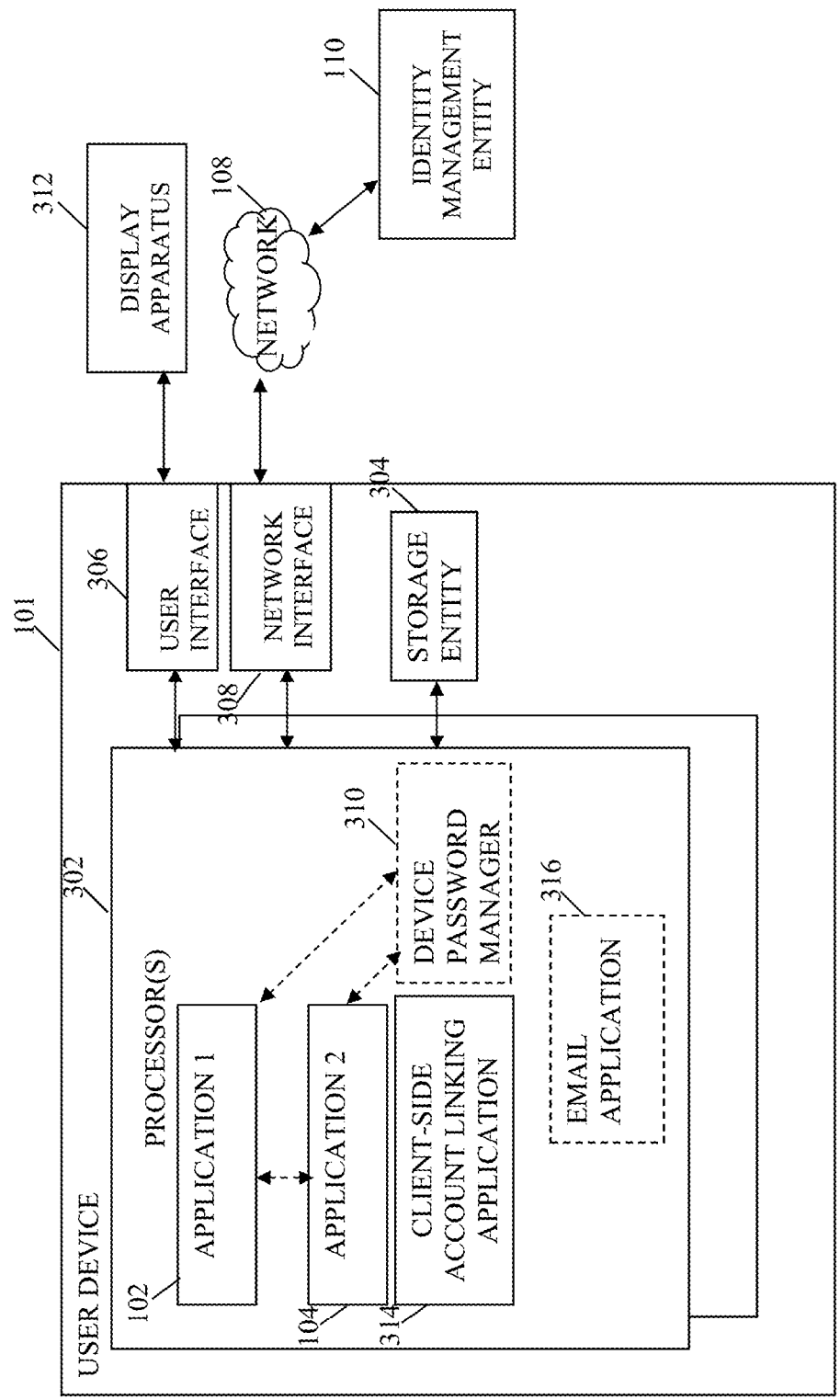
FIG. 3 is a block diagram illustrating an exemplary user device configuration for account linking in accordance with one embodiment of the present disclosure.

Referring now to FIG. 3, an exemplary user device 101 configuration for account linking is shown. The user device 101, may comprise a computerized apparatus from which one or more applications may be run. The device 101 may comprise a personal computer, laptop, tablet, smart phone, health-monitoring device, etc.

As illustrated, the device 101 includes a storage apparatus 304, and one or more user interfaces 306, network interfaces 308, and processors 302 configured to run one or more software applications thereon (discussed below). The device 101 further includes various optional features including a device password manager 310 and an email application 316 (run on the processors 302). Other components of the user device 101 may additionally be provided to ensure functioning thereof (not shown). For example, the device 101 may include e.g., input/output devices (such as display, touchpad, keyboard, cursor control and so forth) and additional communication interfaces (such as network interface cards, modems and so forth), not shown. Moreover, the elements may be coupled to each other via system bus including one or more bridged busses (not shown).

The storage apparatus 304 of the device 101 is utilized to store information relating to the first, second, third, etc. applications running thereon. For example, the storage apparatus 304 may store the applications themselves. In addition, account data relating to the first, second, third, etc. applications running on the device 101 may be stored at the storage apparatus 304. For example, activity data may be stored temporarily at the storage apparatus 304 then later transmitted via the network 108 to the identity management entity 110. The storage apparatus 304 may include mass storage devices such as diskette, hard drive, compact disc read only memory (CD-ROM) and so forth.

The user interfaces 306 comprise means by which a user can interact with various ones of the applications or programs on the device 101. In one embodiment, a graphic user interface (GUI) is displayed to the user via a display apparatus 312, which may be located within the user device 101 or separate therefrom. For example, the GUI may be displayed on a display screen of a smart phone (in this example, the smart phone comprises the user device 101).

The network interfaces 308 enable communication between the user device 101 and the health monitoring devices 107, the identity management entity 110, and other network devices (such as e.g., a device manufacturer or application developer/server (not shown)). Communication between via network interfaces 308 occurs via the network 108.

The user device 101 further includes one or more processors or processor cores 302 configured to run various computer applications thereon, which may be stored at e.g., the storage apparatus 304. For the purpose of this application, including the claims, the terms "processor" and "processor cores" may be considered synonymous, unless the context clearly requires otherwise.

The computer applications run by the processor 302 include at least a plurality of health-monitoring applications (102, 104, 106, etc.) and a client-side account linking application 314. In one variant, the client-side account linking application 314 comprises one of the heath-monitoring applications 102, 104, 106, etc. (i.e., functions to both facilitate account linking and monitor or otherwise receive information relating to a heath parameter). In another variant, the processor 302 is further configured to run a device password manager 310 which will be discussed in further detail below. In another variant, the processor 302 is further configured to run an email application 316 thereon (also discussed in detail below). Other software applications and processes may be run at the processors 302 to create the herein disclosed features (not shown); the foregoing are merely exemplary. Moreover, the functionality described as attributable to one or more of the foregoing applications may be split across more applications, combined into fewer applications, and/or formed into a single application.

As noted above, the first and second applications 102, 104, 106, etc. comprise health monitoring applications run at the user device 101. These applications are either preloaded on the device 101 at time of manufacture, or downloaded such as via an application server (not shown) in communication with the device 101 via the network 108. In one embodiment, the health monitoring applications 102, 104, 106, etc. receive collected data from the monitoring devices 107. For example, an activity tracking application is configured to collect activity data such as steps taken, distance traveled, rate or pace of a run, and/or flights of stairs climbed, etc. from an activity tracing device; a heart rate monitoring application is configured to collect heartbeat data from a heart rate monitoring device; a sleep tracking application collects data relating to how much time a user/wearer spends sleeping via a sleep tracking device; a nutrition tracking application collects data relating to food and drinks consumed by a user via a nutrition tracking device; a smart scale application collects data relating to a body weight, body fat percentage, and/or body mass index (BMI), etc. from a smart scale device. Exemplary applications 102, 104, 106, etc. include e.g., UA Record™, MapMyFitness®, MyFitnessPal®, Endomundo®, etc. each owned by assignee herein. Other health activity related monitoring applications may additionally be utilized in connection with the present disclosure, such as those specifically designed to receive information from a particular health monitoring device (i.e., an application which is published by the device manufacturer); the foregoing being merely representative of the general concepts of the present disclosure.

In an exemplary embodiment, the account linking process is performed via coordination of a distributed application having client and network-side components. As noted above, the network-side component 120 may be run at the identity management entity 110. (Alternatively, it may be run at a device separated therefrom, yet in communication). The client-side account linking application 314 communicates with the network-side application 120 to provide account linking capabilities. For example, the client-side account linking application 314 may (i) initiate a search/query of the appropriate database in order to determine authentication of a user, (ii) cause creation of user records in the identity management databases (e.g., profile database 112, activity database 114, and authentication database 116), and (iii) update and/or access activity and/or profile data.

In addition, the client-side account linking application 314 is able to perform (or cause to be performed) data processing, such as on behalf of or at the direction of the health monitoring applications 102, 104, 106, etc. The account linking application 314 may further process data across multiple applications 102, 104, 106, etc. For example, data from a nutrition tracking application may be processed in conjunction with data from an activity tracking application via the account linking application 314 in order to determine progress toward weight loss goals.

Still further, the account linking application 314 may be configured to generate a GUI which is displayed to a user of the user device 101. In one embodiment, the GUI may comprise individual GUI associated with each of the applications 102, 104, 106, etc. Alternatively or in addition, the display generation application 316 may enable generation of a unified GUI which includes information obtained via the various health monitoring applications 102, 104, 106, etc. running on the device 101.

In one embodiment, a password manager 310 optionally facilitates the account linking. The password manager 310 comprises an application configured to run on the processor 302 of the device 101 or at a processor in communication with the device 101 via the network 108. The password manager 310 functions as a manager of important user-specific information including e.g., account names, user identifiers, passwords, and credit card/bank account numbers. This information is securely stored in one embodiment using e.g., 256-bit AES encryption at a network 108 server. In one specific variant, the password manager 310 comprises the iCloud Keychain® product of Apple Computer of Cupertino, Calif. which runs on the operating system of the aforementioned Apple iPhone® user device.

The password manager 310 of the present disclosure further enables certain application data to be stored at a network server (not shown), then when the user logs into the application, it may be retrieved therefrom. Specifically, as used in the present embodiment, the password manager 310 is configured to store an authorization credential for each of the linked applications associated with the user. As noted previously, the authorization credential is provided from the identify management entity 110 to the device 101 via the network 108 when an account is created and periodically as updates to credentials which have lapsed. In another embodiment, however, the password manager 310 is charged with creating an authentication credential. The password manager 310 created credential, however, does not replace the encrypted time stamped credential created and stored at the identity management entity 110. In either instance, once the user links more than one application, the appropriate tokens/credentials are placed in storage associated with the password manager 310 and/or the identity management entity 110 and pulled therefrom when necessary. In another variant, if a user uses the same email and password in more than one application, he/she will have the same credential for both applications.

Figure 3A:
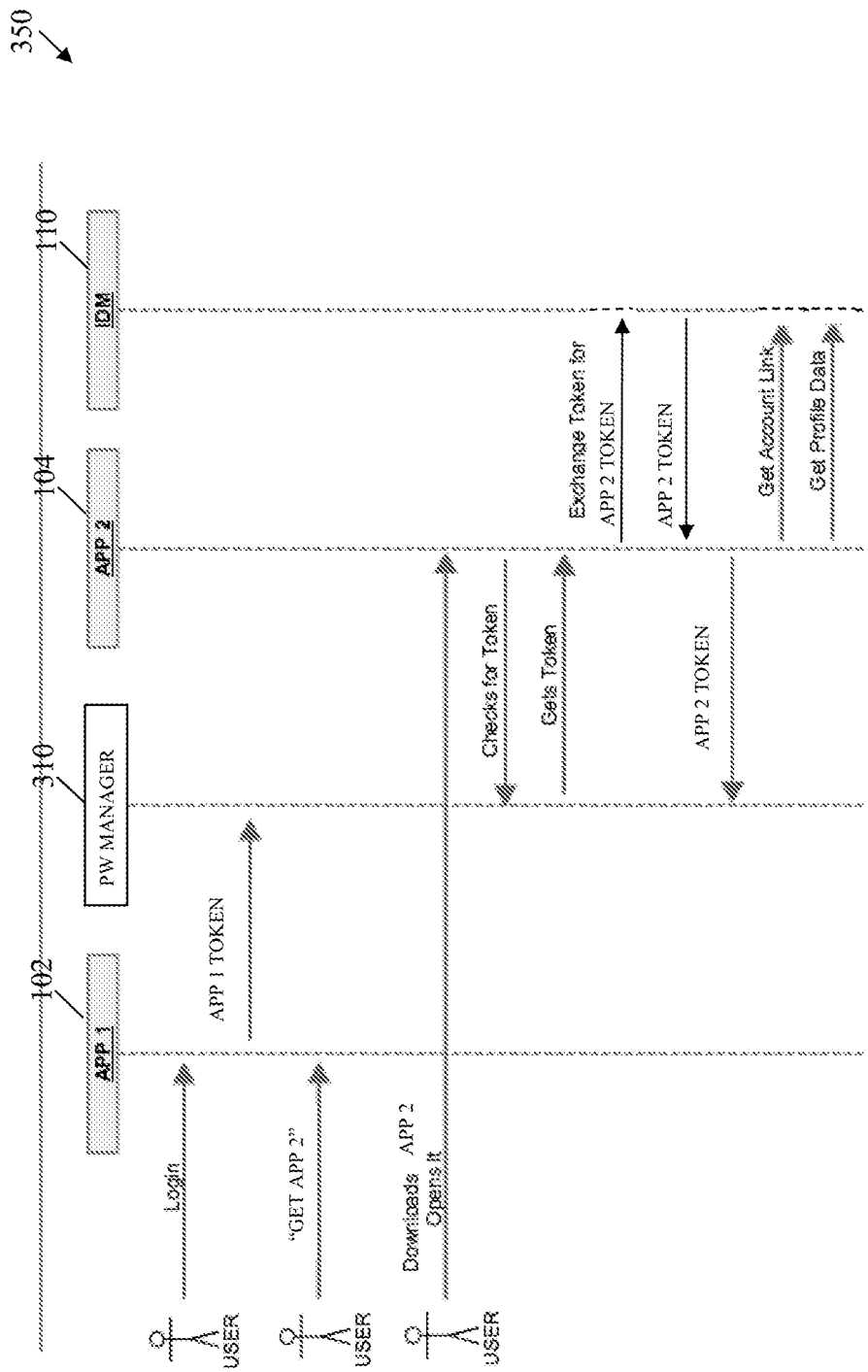
FIG. 3a is a sequence diagram illustrating an exemplary message exchange for linking applications using a password manager in accordance with one embodiment of the present disclosure.

FIG. 3a illustrates an exemplary message exchange 350 for linking applications using a password manager 310 in accordance with this embodiment of the disclosure. As shown, the message exchange 350 begins when the user logs into Application 1 102. During or prior to the login process, an authentication credential for the user in Application 1 is created by the identity management entity 110. As noted above, the authentication credential may comprise an encrypted, time-stamped token which is replaced after a set amount of time to ensure it is authentic. Upon login, Application 1 102 provides its authentication token to the password manager 310 for storage thereat in association with the user (as discussed above). In one variant, this is accomplished via coordination between the client-side account linking application 314 and the network-side account linking application 120.

Next, the user selects a link within Application 1 102 to link to Application 2 via a "get Application 2" command. In response to this command, the user's device 101 will download and/or open Application 2 104. Whether the application 104 is downloaded or simply opened depends on whether the application 104 is already present on the user's device 101. Once opened, Application 2 104 checks the password manager 310 for authorization credentials. These authentication credentials are present at the password manager 310 in the instance the user has previously created an account for him/herself for Application 2 104. In the instance the user has not previously created an account for him/herself in Application 2 104, the user must set up a new account for Application 2 (as discussed above with respect to the method 200 of FIG. 2). An authentication credential is created in the password manager 310 for the newly created account, such credential is then provided in the message exchange 350 back to Application 2 upon request therefor.

Next, in order for the linking process to continue, Application 2 104 provides the password manager 310-created credential to the identity management entity 110 where it is exchanged for an identity management entity 110-created credential. The new credential for Application 2 104 is then stored at the password manager 310 for subsequent use. In addition, Application 2 104 is able to access the user's account and profile information subsequent to the credential exchange. In another embodiment (not shown), a temporary or short-lived key may be exchanged for the password manager-created credential which is later exchanged for a longer-lived credential after the accounts have been successfully linked.

At this point, the user need only log into one of Application 1 and/or Application 2 in order to view, edit, collect, monitor, compare, etc. data in either application. Moreover, when the user logs on to Application 1 102 and/or Application 2 104, activity and other data collected or entered thereat is provided to the identity management entity 110 for unified collection and storage. In one variant, this is accomplished via coordination between the client-side account linking application 314 and the network-side account linking application 120 to ensure that records are kept up to date at the identity management entity 110.

Additionally, while the foregoing example is given with respect to a first being linked to only one second application, the first application may link to multiple second applications using substantially similar logic as that discussed above.

Referring back again to FIG. 3, in another embodiment, the account linking occurs when the first and second applications are 102, 104, 106, etc. able to communicate directly with one another. As noted above, the first and second applications 102, 104, 106, etc. comprise health monitoring applications run at the user device 101. However, unlike the previous embodiment, the first and second applications 102, 104, 106, etc. are configured to communicate with one another because they are published by the same application publisher. In another example, the applications may be configured to communicate with one another due to the underlying operating system which enables the communication. In contrast, the first and second applications of the previously discussed embodiment need not be published by the same publisher.

The direct application communication (demonstrated by the dashed line there between of FIG. 3) enables a user within the first application to select a link to the second application and to be switched to the second application. In other words, the user opens the first application and selects a link to have the second application linked to the first application. By selecting the link, the user device 101 opens the second application. The second application then obtains appropriate credentials to cause the linking to occur. In one variant, this is accomplished via coordination between the client-side account linking application 314 and the network-side account linking application 120 as discussed elsewhere herein to obtain the authentication credentials from the database 116.

Figure 3B:
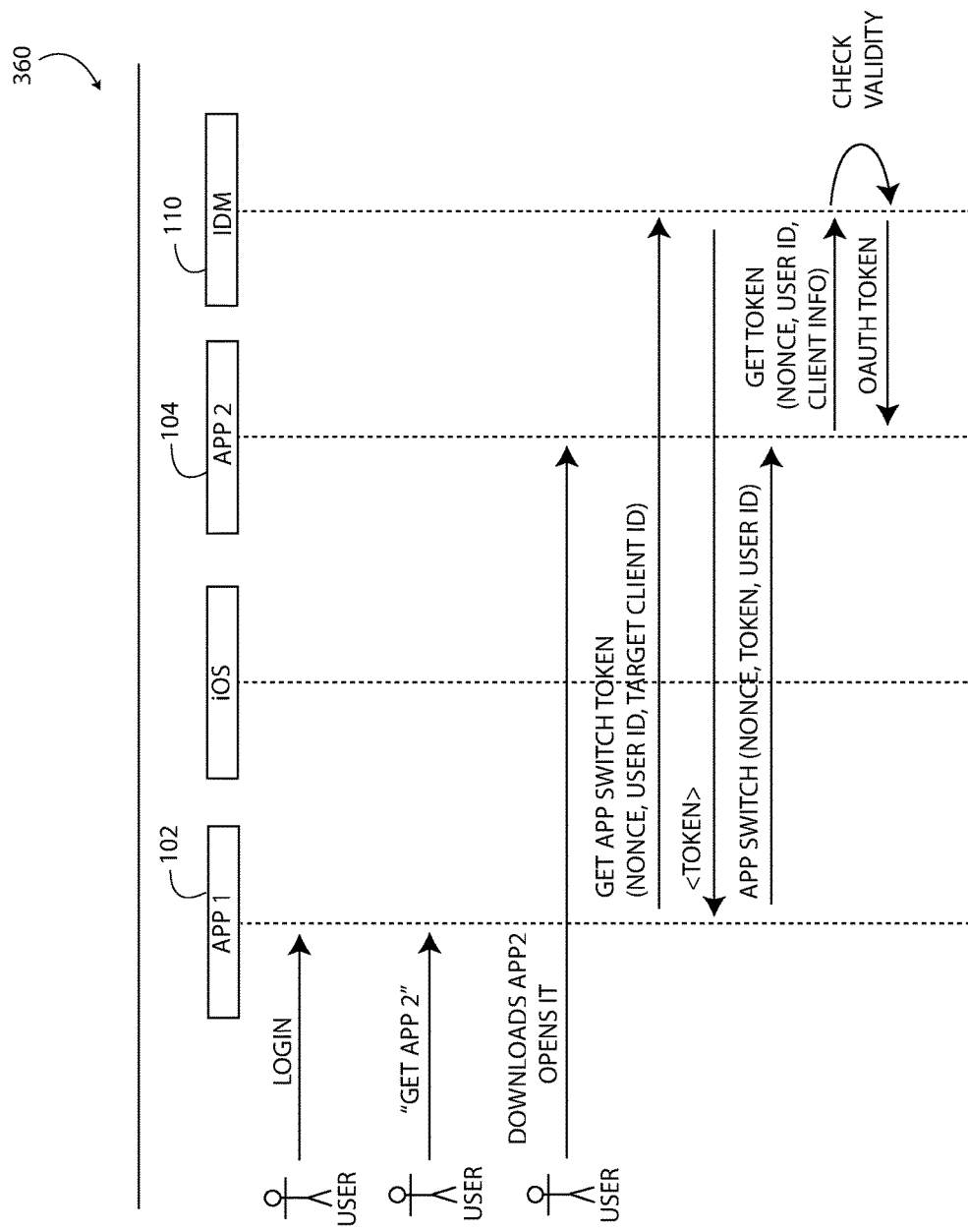
FIG. 3b is a sequence diagram illustrating an exemplary message exchange for linking applications using direct application communication in accordance with one embodiment of the present disclosure.

FIG. 3b illustrates an exemplary message exchange 360 for linking applications using direct application communication in accordance with the present embodiment. As shown, the message exchange 360 begins when the user logs on to Application 1 102. As discussed previously, during or prior to the login process, an authentication credential for the user in Application 1 is created by the identity management entity 110 and stored at the authentication database 116. While in Application 1 102, the user selects to "link" Application 1 102 to Application 2 104 thereby causing a "get Application 2" command. In response to this command, the user's device 101 will download and/or open Application 2 104. Whether the application 104 is downloaded or simply opened depends on whether the application 104 is already present on the user's device 101. In one variant, this is determined via coordination between the client-side account linking application 314 and the network-side account linking application 120.

In this embodiment, i.e., because Application 1 and 2 are provided by the same publisher, Application 1 may in response to the selection of the link cause an application switch. To accomplish the switch, Application 1 102 requests a switch token from Application 2 104. Application 2 104 replies with the token; and the switch occurs. The switch is completed successfully when the display apparatus 312 displays Application 2 104.

Once opened, Application 2 104 requests authorization credentials from the identity management entity 110. These authentication credentials are present in the instance the user has previously created an account for him/herself for Application 2 104. In the instance the user has not previously created an account for him/herself in Application 2 104, the user must set up a new account for Application 2 (as discussed above with respect to the method 200 of FIG. 2). Once the authentication token is created and/or validity of the user is checked, the identity management entity 110 returns the token to Application 2 104.

In this manner, the user need only log into one of Application 1 and/or Application 2 in order to view, edit, collect, monitor, compare, etc. data in either. Moreover, when the user logs on to Application 1 102 and/or Application 2 104, activity and other data collected or entered thereat is provided to the identity management entity 110 for unified collection and storage. In one variant, this is facilitated via coordination between the client-side account linking application 314 and the network-side account linking application 120.

Although the foregoing example discusses a first and a second application being linked, the first application may link to multiple second applications using substantially similar logic as that discussed above.

Referring back again to FIG. 3, in another embodiment, the account linking occurs using email verification via an email application 316 running on the user device 101. The email application 316 of this embodiment functions as a typical email application in that it is configured to enable a user to access, view, manage, draft and send email messages. With respect to the account linking functionality discussed herein, the email application 316 is utilized in the instance that the first application cannot find the one or more second applications to which it is to be linked on the user's device 101. That is, when the user requests to link one or more second applications to the first application, the first application searches for the one or more second applications. In one variant, the first application searches via direct communication mechanisms; in another variant, the password manager 310 is utilized to find the one or more second applications; in a further variant, the authentication database 116 is queried.

In the instance one or more second applications cannot be found and/or authentication of the one or more second applications errs or is not successful, the client-side account linking application 314 causes an email message to be generated and sent to the user's email account. The email account to which the email message is sent may be obtained by the account linking application 314, in one embodiment, by querying the profile database 112. The user may then open the email application 316 to retrieve the email message, which contains a link to open and/or download the one or more second applications.

Figure 3C:
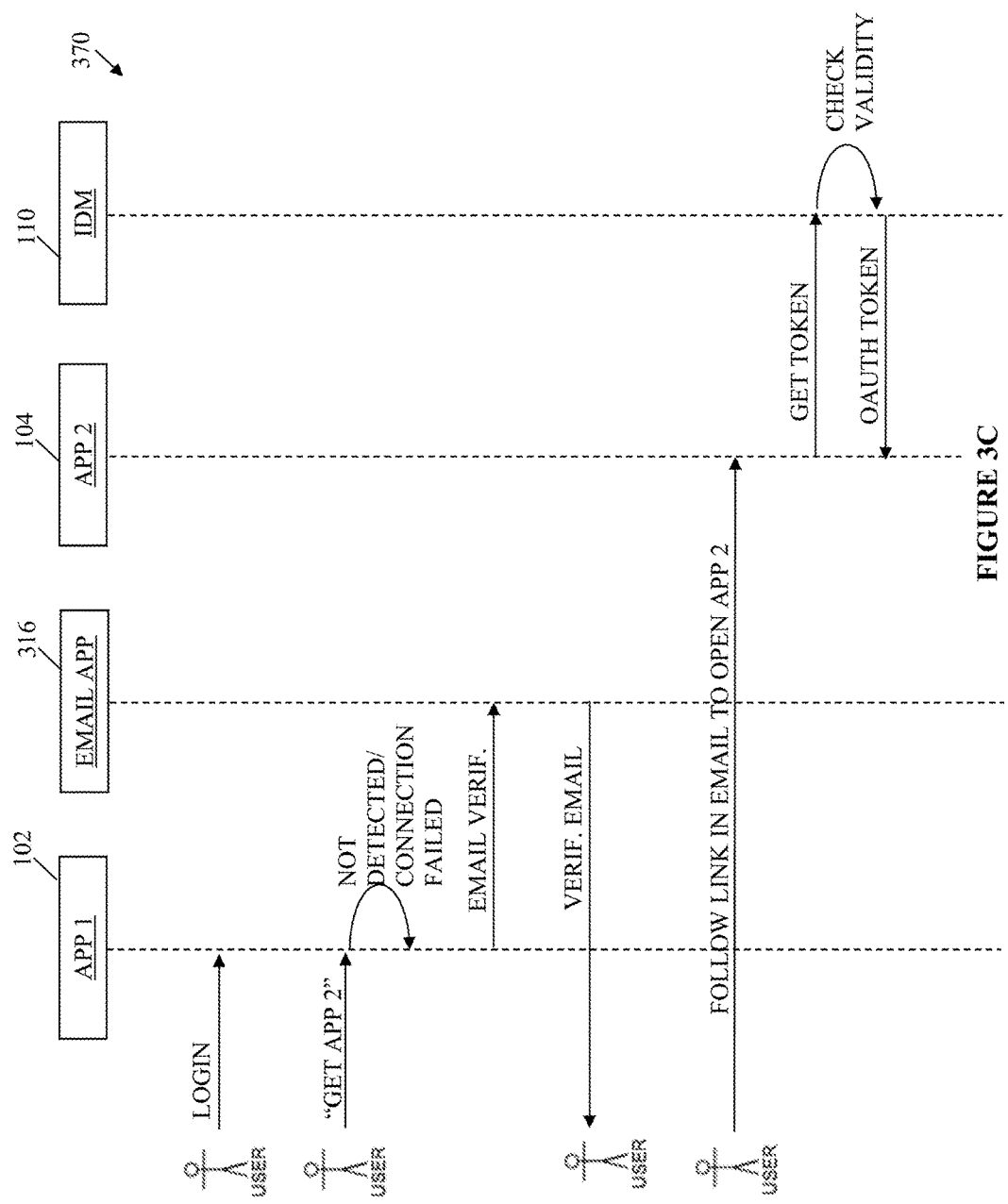
FIG. 3c is a sequence diagram illustrating an exemplary message exchange for linking applications using email verification in accordance with one embodiment of the present disclosure.

FIG. 3c illustrates an exemplary message exchange 370 for linking applications using email verification in accordance with the present embodiment. As shown, the message exchange 370 begins when the user logs on to Application 1 102. As discussed previously, during or prior to the login process, an authentication credential for the user in Application 1 is created by the identity management entity 110 and stored at the authentication database 116. While in Application 1 102, the user selects to "link" Application 1 102 to Application 2 104 thereby causing a "get Application 2" command. In response to this command, the user's device 101 will download and/or open Application 2 104 under normal circumstances. However, in the given example, Application 2 104 cannot be detected and/or a connection thereto fails.

In response, the message exchange 370 continues and Application 1 sends an email verification to the user's email address which shows up in the email application 316. The user is notified of the presence of the email, and proceeds to follow a link within the verification email to open Application 2 104. Once opened, Application 2 104 requests authorization credentials from the identity management entity 110. These authentication credentials are present in the instance the user has previously created an account for him/herself for Application 2 104. In the instance the user has not previously created an account for him/herself in Application 2 104, the user must set up a new account for Application 2 (as discussed above with respect to the method 200 of FIG. 2). Once the authentication token is created and/or validity of the user is checked, the identity management entity 110 returns the token to Application 2 104.

Hereafter, the user need only log into one of Application 1 and/or Application 2 in order to view, edit, collect, monitor, compare, etc. data in either. Moreover, when the user logs on to Application 1 102 and/or Application 2 104, activity and other data collected or entered thereat is provided to the identity management entity 110 for unified collection and storage. In one variant, this is facilitated via coordination between the client-side account linking application 314 and the network-side account linking application 120.

Referring back again to FIG. 3, it is further noted that in one embodiment, one or more of the foregoing applications (310, 314, 316, 102, 104, 106, etc.) may be a launched via a generic browser, such as Internet Explorer, available from Microsoft Corp., of Redmond, Wash., or Safari from Apple Computer of Cupertino, Calif., e.g., such as in cases where the user device 101 comprises a desktop or laptop computer. In other embodiments, one or more of the applications (310, 314, 316, 102, 104, 106, etc.) may comprise client side applications, e.g., in cases where the user device 101 comprises a tablet or smartphone. In such cases, the applications (310, 314, 316, 102, 104, 106, etc.) may be stored at a storage apparatus independent or separate from the device 101 itself.

The applications which enable the herein disclosed single sign-on and account linking functionality include the password manager 310, email application 316, and/or the client-side account linking application 314 in the present embodiment. A permanent copy of the programming instructions for these applications (310, 314, 316) may be placed into permanent storage devices (such as e.g., the storage apparatus 304) during manufacture of the user device 101, or in the field, through e.g., a distribution medium (not shown), such as a compact disc (CD), or through communication interface 308 (from a distribution server (not shown)) via the network 108. That is, one or more distribution media having an implementation of the agent program may be employed to distribute the agent and program various computing devices.

The herein described applications (310, 314, 316) improve the functioning of the user device 101 by enabling it to provide a unified user interface and single sign on capabilities which enables a user/operator to examine the health related parameters measured by a plurality of devices via a single interface and across any of the linked health monitoring applications 102, 104, 106, etc. Furthermore, devices that are able to link a plurality of applications 102, 104, 106, etc. so as to create a single sign-on experience and enable data sharing there between can operate more efficiently to provide a user with integrated health related parameter information and conclusions to assist the user in establishing and maintaining healthy lifestyle patterns.

In summary, a method of enabling a plurality of applications running on a mobile device to share data is disclosed. In one embodiment, the method comprises (i) enabling a user to create an account with a first application; (ii) receiving at the first application a request from the user to link the first application to one or more second applications; (iii) obtaining respective authorization credentials for the one or more second applications; and (iv) causing a record to be created at a network database, the record indicating the respective authentication credentials of the one or more second applications and an authentication credential of the first application as being linked to the user. When data is collected and/or modified at any of the first application and the one or more second applications, the record is utilized to associate the data to the user. The data associated to the user is accessible by the first application and the one or more second applications.

In addition, an apparatus for management of data across a plurality of applications running thereon is disclosed. In one embodiment, the apparatus comprises: at least one interface configured to enable communication with at least one network management entity having at least one database associated therewith; a storage entity; and a processor configured to communicate to said storage entity, and said at least one interface, said processor configured to execute a plurality of health-monitoring computer programs and at least one data management computer program thereon, said data management computer program comprising a plurality of instructions which are configured to, when executed by said processor, cause said apparatus to: (i) receive a request from a user to link one or more of said plurality of health-monitoring computer programs to a single account; (ii) obtain respective authorization credentials for said one or more of said plurality of health-monitoring computer programs; (iii) cause said network management entity to create a record to be stored in said database, said record configured to indicate said respective authentication credentials for said one or more of said plurality of health-monitoring computer programs and an authentication credential of said data management computer program as being associated to said user; and (iv) utilize said record to ensure that data collected and/or modified at said one or more of said plurality of health-monitoring computer programs is associated to said user and accessible across each of said one or more of said plurality of health-monitoring computer programs.

Furthermore, a non-transitory, computer readable medium is disclosed. In one embodiment, the non-transitory, computer readable medium comprises a plurality of instructions which are configured to, when executed: (i) receive a request to link one or more of a plurality of computer applications running on a mobile device; (ii) obtain authorization credentials for those ones of said one or more of said plurality of computer applications to be linked from a first network database; (iii) cause said one or more of said plurality of computer applications to be linked by placing said authorization credentials of each in a single record associated to a user thereof at a second network database; and (iv) when data is collected and/or modified at said one or more of said plurality of computer applications, said credentials within said single record being used to associate said data to said user.

It will be appreciated that the various ones of the foregoing aspects of the present disclosure, or any parts or functions thereof, may be implemented using hardware, software, firmware, tangible, and non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A mobile apparatus for management of data across a plurality of applications running thereon, said mobile apparatus comprising:
at least one interface configured to enable communication with at least one network management entity having at least one database associated therewith;
a storage entity; and
a processor configured to communicate to said storage entity, and said at least one interface, said processor configured to execute a plurality of health-monitoring computer programs and at least one data management computer program thereon, said data management computer program comprising a plurality of instructions which are configured to, when executed by said processor, cause said mobile apparatus to:
receive a request from a user to link one or more of said plurality of health-monitoring computer programs to a single account;
obtain respective authorization credentials for said one or more of said plurality of health-monitoring computer programs;
in response to said request from the user to link, cause said network management entity to create a record to be stored in said database, said record configured to indicate said respective authentication credentials for said one or more of said plurality of health-monitoring computer programs and an authentication credential of said data management computer program as being associated to said user; and utilize said record to ensure that data collected and/or modified at said one or more of said plurality of health-monitoring computer programs is associated to said user and accessible across each of said one or more of said plurality of health-monitoring computer programs.

2. The mobile apparatus of claim 1, further comprising at least one second interface configured to enable communication with a plurality of health-related parameter monitoring devices, said health-related parameter monitoring devices configured to provide said collected and/or modified data.

3. The mobile apparatus of claim 1, wherein said plurality of instructions of said data management are further configured to, when executed by said processor, cause said mobile apparatus to utilize said record to enable said user to sign in to any of said plurality of health-monitoring computer programs and be automatically signed into all of said plurality of health-monitoring computer programs.

4. The mobile apparatus of claim 1, wherein said plurality of instructions of said data management are further configured to, when executed by said processor, cause said mobile apparatus to:

determine whether said user has established an account with said one or more of said plurality of health-monitoring computer programs; and when said user has not established an account with said one or more of said plurality of health-monitoring computer programs, enable said user to create an account therewith.

5. The mobile apparatus of claim 1, wherein said at least one data management computer program further comprises one of said plurality of health-monitoring computer programs.

6. The mobile apparatus of claim 1, wherein said plurality of instructions of said data management are further configured to, when executed by said processor, cause said mobile apparatus to utilize said record to ensure data association and accessibility via direct communication between each of said plurality of health-monitoring computer programs and said at least one data management computer program.

7. The mobile apparatus of claim 1, wherein said plurality of instructions of said data management are further configured to, when executed by said processor, cause said mobile apparatus to utilize said record to ensure data association and accessibility via a password manager computer program also running on said processor, said password manager computer program comprising a plurality of instructions configured to when executed, store access credentials associated to each of said plurality of health-monitoring computer programs with which said user has an account.

8. The mobile apparatus of claim 1, wherein said plurality of instructions of said data management are further configured to, when executed by said processor, cause said mobile apparatus to utilize said record to ensure data association and accessibility via email verification of an account with at least one of said plurality of health-monitoring computer programs associated to said user.

9. A method of enabling a plurality of health monitoring applications running on a mobile device to share data, said method comprising:

enabling a user to create an account with a first health monitoring application;

receiving at the first health monitoring application a request from said user to link said first health monitoring application to one or more second health monitoring applications;

obtaining respective authorization credentials for said one or more second health monitoring applications; and in response to said request from said user to link, causing a record to be created at a network database, said record indicating said respective authentication credentials of said one or more second health monitoring applications and an authentication credential of said first health monitoring application as being linked to said user;

wherein when data is collected and/or modified at any of said first health monitoring application and said one or more second health monitoring applications, said record is utilized to associate said data to said user; and wherein said data associated to said user is accessible by said first health monitoring application and said one or more second health monitoring applications.

10. The method of claim 9, wherein said act of obtaining respective authorization credentials for said one or more second health monitoring applications further comprises:

determining whether said user has established an account with said one or more second health monitoring applications; and when said user has not established an account with said one or more second health monitoring applications, enabling said user to create an account with said one or more second health monitoring applications.

11. The method of claim 9, wherein when said user signs in to either said first health monitoring application or said one or more second health monitoring applications, said user is automatically signed into all of said first health monitoring application and said one or more second health monitoring applications based at least in part on said creation of said record at said network database.

12. The method of claim 9, wherein said first health monitoring application and said one or more second health monitoring applications each comprises a health-related parameter monitoring application, and said first health monitoring application is further in communication with said network database.

13. The method of claim 9, wherein said data associated to said user is stored at a second network database.

14. The method of claim 9, wherein said first health monitoring application and said one or more second health monitoring applications comprise at least one of:

a heart rate monitoring application;
an activity tracking application;
a smart scale application;
a sleep tracking application; and/or
a nutrition tracking application.

15. The method of claim 9, wherein said mobile device comprises a smart phone configured to run said first health monitoring application and said one or more second health monitoring applications thereon.

16. A non-transitory, computer readable medium comprising a plurality of instructions which are configured to, when executed:

receive a request to link one or more of a plurality of health monitoring applications running on a mobile device;

obtain authorization credentials for those ones of said one or more of said plurality of health monitoring applications to be linked from a first network database;

in response to said request to link, cause said one or more of said plurality of health monitoring applications to be linked by placing said authorization credentials of each in a single record associated to a user thereof at a second network database; and when data is collected and/or modified at said one or more of said plurality of health monitoring applications, said credentials within said single record being used to associate said data to said user.

17. The non-transitory, computer readable medium of claim 16, wherein said data is further made accessible across each of said one or more of said plurality of health monitoring applications via utilization of said credentials within said single record.

18. The non-transitory, computer readable medium of claim 16, wherein said mobile device comprises a smart phone configured to run said health monitoring applications thereon, wherein said plurality of instructions are further configured to automatically sign the user into the one or more second health monitoring applications after the user signs into said first health monitoring application.

19. The non-transitory, computer readable medium of claim 16, wherein said authorization credentials are obtained via a query of said database for an existing record of said user thereof.

20. The non-transitory, computer readable medium of claim 19, wherein said plurality of instructions are further configured to enable said user to create an account with individual ones of said one or more of said plurality of health monitoring applications for which said query returns no existing record of said user.

* * * * *